US012540496B2

(12) United States Patent
Wilke et al.

(10) Patent No.: US 12,540,496 B2
(45) Date of Patent: Feb. 3, 2026

(54) ACTUATING MECHANISM FOR ACTUATING COVERS FOR VEHICLES

(71) Applicant: Illinois Tool Works Inc., Glenview, IL (US)

(72) Inventors: Zsolt Wilke, Bad Mergentheim (DE); Andreas Rudolf, Eibelstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 50 days.

(21) Appl. No.: 18/123,098

(22) Filed: Mar. 17, 2023

(65) Prior Publication Data

US 2023/0313571 A1 Oct. 5, 2023

(30) Foreign Application Priority Data

Mar. 30, 2022 (DE) ..................... 10 2022 107 582.6

(51) Int. Cl.

*E05B 81/90* (2014.01)
*E05B 81/04* (2014.01)
*E05B 85/10* (2014.01)
*E05B 85/12* (2014.01)
*E05B 85/16* (2014.01)

(52) U.S. Cl.

CPC .............. *E05B 81/90* (2013.01); *E05B 81/04* (2013.01); *E05B 85/103* (2013.01); *E05B 85/12* (2013.01); *E05B 85/16* (2013.01)

(58) Field of Classification Search

None

See application file for complete search history.

(56) References Cited

U.S. PATENT DOCUMENTS 8,505,241 B2 * 8/2013 Kusunoki ............. E05F 15/646 296/146.4

FOREIGN PATENT DOCUMENTS

| | | | | |
|---|---|---|---|---|
| DE | 102013112706 | | 5/2015 | |
| DE | 102018222304 | | 6/2020 | |
| DE | 102020207532 | A1 * | 12/2021 | |
| DE | 102020209655 | | 2/2022 | |
| EP | 3103946 | | 12/2016 | |
| WO | 2017070307 | | 4/2017 | |
| WO | WO-2017070307 | A1 * | 4/2017 | ............. E05B 77/06 |
| WO | WO-2021083523 | A1 * | 5/2021 | ......... E05B 17/0066 |

OTHER PUBLICATIONS

Examination report dated Feb. 20, 2023 in German application No. 10 2022 107 582.6, (7 pages).

* cited by examiner

*Primary Examiner* — Christine M Mills
*Assistant Examiner* — Christopher F Callahan
(74) *Attorney, Agent, or Firm* — McAndrews, Held & Malloy, Ltd.

(57) ABSTRACT

The present disclosure relates to an actuating mechanism for actuating, in particular opening, vehicle doors, wherein the actuating mechanism comprises the following: a housing having a pivot axis; an actuating element, which is transferable from a home position into an actuating position in order to generate an electrical actuation signal and into an emergency release position for manual unlocking of the vehicle door, wherein the actuating element comprises a curved region, which is pivotally connected to the pivot axis, and wherein the curved region is arranged in the home position of the actuating element in the housing and protrudes from the housing in the emergency release position of the actuating element.

18 Claims, 7 Drawing Sheets

ACTUATING MECHANISM FOR ACTUATING COVERS FOR VEHICLES

RELATED APPLICATION

The present application claims the benefit of German Patent Application No. 10 2022 107 582.6, filed Mar. 30, 2022, titled “Actuating Mechanism For Actuating Covers For Vehicles,” the contents of which are hereby incorporated by reference.

BACKGROUND

In the automotive industry, doors and flaps are increasingly no longer only opened or closed manually, i.e., mechanically. Rather, the opening or closing movements are performed more frequently automatically, in particular electrically. For example, an electric motor is used here, which, when desired, drives a mechanism for opening or closing the doors and flaps. In order to generate a signal for opening or closing to such electric drives or the associated control devices, a switch can be provided, which generates the desired signal by an actuation of the user. Such switches can be configured as push-buttons, which, when pressed in by the user, generate the aforementioned signal.

In order to not be reliant on the opening or closing of the doors by the electric drive, it is known to provide a mechanical (manual) emergency release. This allows the user to open or close the doors or flaps manually. Such mechanical actuators, such as conventional interior or exterior door handles, are often provided separately from the push-buttons configured as signal transmitters. Not only does this require additional design space for the mechanical variant, but it also results in a non-uniform overall image in which modern electrical push-buttons are connected to traditional mechanical levers.

A door handle known from the prior art, in particular an outer door handle, is known from WO2017070307. The door handle can be pivoted between one flush and two extended positions, as can be seen in particular in FIGS. 3*a* to 3*d*. For this purpose, a pivot arm is connected to the grip region and moves it opposite the vehicle outer skin. The solution shown has the disadvantage that only a small pivoting movement of the handle is possible, because a further pivoting through the outer skin is prevented.

For the above-mentioned reasons, the problem addressed by the present disclosure is to specify an actuating mechanism for actuating vehicle doors, which enables an electrical as well as manual actuating function and can be arranged even in the smallest possible space. A problem also addressed by the present disclosure is to provide an actuating mechanism in which the manual actuation function is not directly visible. Finally, a problem ad-dressed by the present disclosure is to specify an actuating mechanism that allows for long actuation paths even in small spaces.

SUMMARY

The present disclosure relates to an actuating mechanism for actuating vehicle doors, in particular for opening vehicle doors, substantially as illustrated by and described in connection with at least one of the figures, as set forth more completely in the claims. More specifically, the present disclosure further relates to a vehicle having an actuating mechanism for actuating vehicle doors.

Accordingly, the disclosure relates to an actuating mechanism for actuating, in particular opening, vehicle doors, wherein the actuating mechanism 100 comprises the following: a housing having a pivot axis; and an actuating means, which is transferable from a home position into an actuating position in order to generate an electrical actuation signal and into an emergency release position for manual unlocking of the vehicle door, wherein the actuating means comprises a curved region, which is pivotally connected to the pivot axis, and wherein the curved region is arranged in the home position of the actuating means in the housing and protrudes from the housing in the emergency release position of the actuating means.

With the curved region of the actuating means, it is achieved that the actuating means can be moved substantially entirely into and out of the housing via pivoting movement. Accordingly, an especially compact design is possible on the one hand. On the other hand, the curved region can thus be arranged such that it is only visible in the emergency release position. In the home position as well as the actuating position, the curved region is arranged inside the housing and accordingly is not visible to the user.

According to a further embodiment, the curved region is pivotable into the housing in order to be transferred into the actuating position. Accordingly, a pivoting of the curved region can be used on the one hand in order to transfer the actuating means into the emergency release position and on the other hand in order to transfer the actuating means into the actuating position. The pivotal kinematics realized by the curved region is accordingly especially simple and robust.

According to a further embodiment, the curved region is pivotable out of the housing in order to be transferred into the emergency release position.

According to a further embodiment, the actuating means has a substantially trumpet-like cross-section. An especially compact arrangement of the actuating means within the housing can thereby be achieved.

According to a further embodiment, the actuating means is pivotable in a first direction in order to be transferred from the home position into the actuating position and pivotable in an opposite second direction in order to be transferred from the home position into the emergency release position. This can make it difficult for the user to make a mistake when actuating the actuating means. In particular, this can prevent the actuating mechanism from being manually activated in normal operation. It is also achieved hereby that the electrical actuation can be achieved by means of a pushing, wherein a pulling for activating a Bowden cable is simultaneously possible, without having to provide a complicated kinematics.

According to a further embodiment, the actuating means is pivotable by at least 80° to 100°, in particular by about 90°, between the home position and the emergency release position. When pivoting out of the home position into the emergency release position, the curved region is largely pivoted out of the interior of the housing. It can be pivoted by at least 80° without reaching far into the vehicle interior. A pivoting of the actuating means 104 by 90° can simultaneously be used in order to strongly pivot an emergency release element configured as a pull lever in the housing interior and thus to activate a Bowden cable.

According to a further embodiment, the curved region comprises a first portion having a first radius and a second portion having a second, smaller radius. Accordingly, the curved region is constructed substantially like a cam disk in order to be able to activate a pressure switch when the actuating means is pivoted. This embodiment presents a very simple variant for generating an opening signal for an electric drive.

According to a further embodiment, the actuating means comprises a grip region, which is arranged at a first end of the curved region and is configured in order to cover the curved region in the home position and/or the actuating position. According to this embodiment, the grip region not only serves to manually pivot the actuating means, but also protects the kinematics of the actuating means connected to the curved region against soiling. At the same time, the grip region serves as a visual protection, so that the kinematics of the actuating means is not visible to the user, at least in the home position.

According to a further embodiment, the grip region comprises an outer side configured as a push-button for transferring the actuating means into the actuating position and a rear side configured as a pull-handle for transferring the actuating means into the emergency release position. The grip region can thus be used simultaneously in order to transition the actuating means into the actuating position and the emergency release position.

According to a further embodiment, the actuating mechanism comprises a trough body extending around the grip region in such a way that the rear side of the grip region is graspable in the home position of the actuating means. The trough body is an especially simple and reliable variant in order to enable the user to grasp the grip region. To this end, the user can engage with one or more fingers in a free region of the trough body and pull the grip region out of the housing via its rear side. By pulling on the grip region, the curved region as well as all other regions of the actuating means are also pivoted.

A further aspect of the present disclosure relates to a vehicle having any one of the actuating mechanisms described above.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
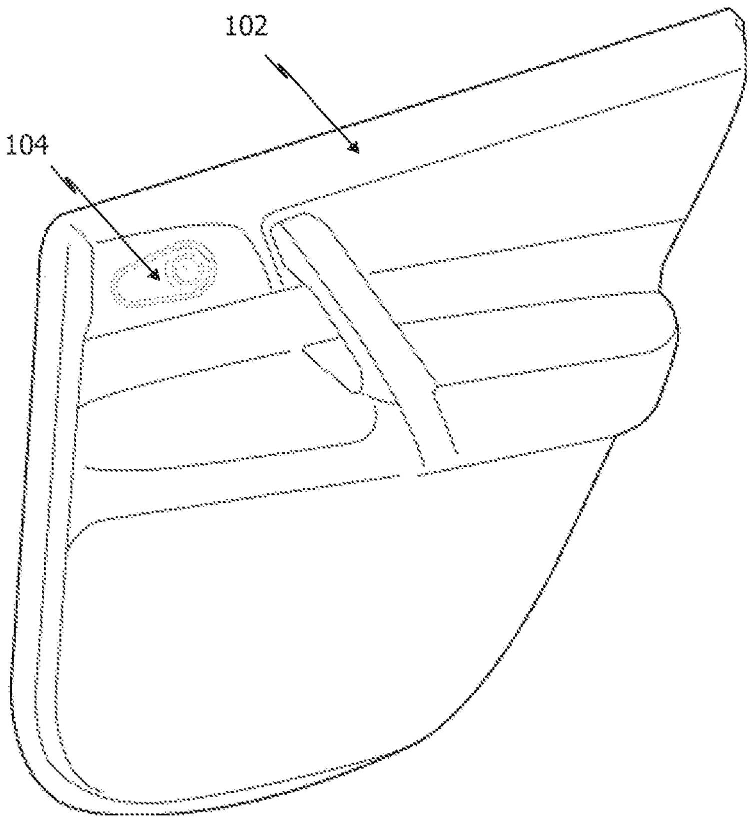
FIG. 1 is a schematic view of an interior door having an actuating mechanism according to an embodiment of the present disclosure.

FIG. 1 shows a schematic view of an interior vehicle door 102 with an actuating mechanism for actuating, in particular opening, the vehicle door. In particular, the actuating mechanism shown schematically herein is provided in order to fulfill two opening functions: on the one hand, the actuating mechanism allows the vehicle door to be electrically opened. For this purpose, the actuating mechanism comprises an actuating means 104, which, for example, can be an actuating element that can be pushed in by the user towards the vehicle door in order to activate an electric drive. On the other hand, the actuating mechanism can be used in order to manually, that is, mechanically, open the door, as will be discussed in greater detail later. This can be especially necessary when the electric drive or the associated signal generator fails.

Figure 2:
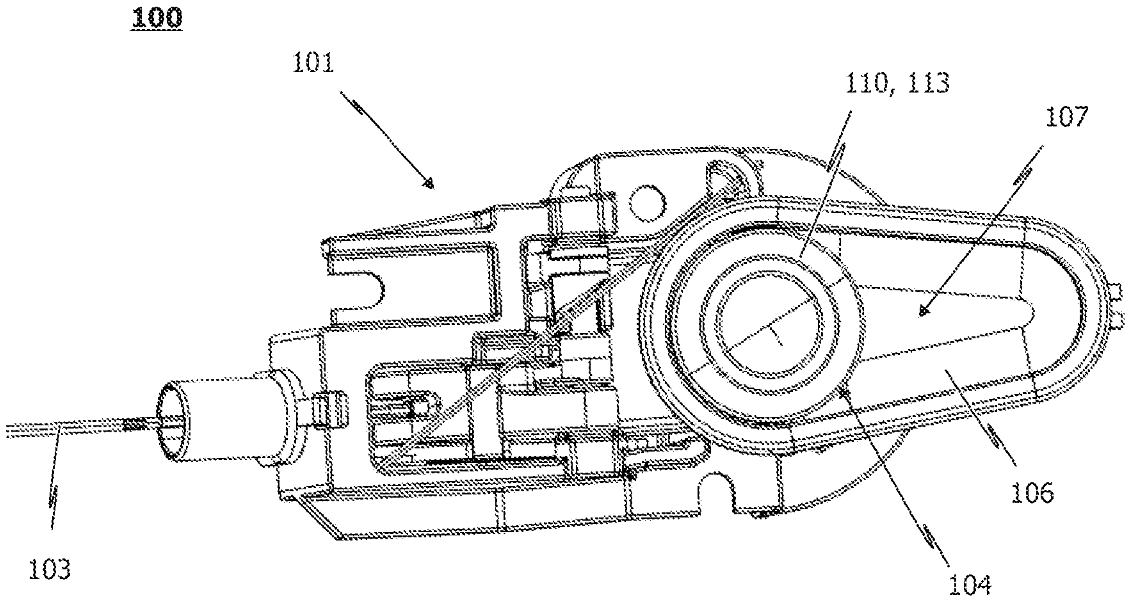
FIG. 2 is a schematic perspective view of an actuating mechanism according to an embodiment of the present disclosure.

FIG. 2 provides a schematic perspective view of an actuating mechanism according to an embodiment of the present disclosure. The actuating mechanism 100 comprises an actuating means 104 already shown in FIG. 1. It comprises a grip region 110 configured on the outside as a push-button. The actuating means 104 is received in a trough body 106, which can be configured so as to cover an opening in the interior skin of the vehicle interior door that corresponds to the shape of the trough body 106.

The trough body 106 is substantially oval-shaped. However, the trough body 106 is not limited to the oval shape shown in the figures. Rather, the trough body can have any shape that allows for a rearward engagement of the grip region 110. Accordingly, the trough body has a surface correspondingly larger than the outside 113 of the grip region 110 shown in FIG. 2. Thus, the trough body has a free engagement region 107, which, in the home position of the actuating means 104, is not covered by the grip region 110 and permits an engagement with the trough body 106 by the user. Of course, such a free engagement region is also possible with any other shape (e.g., rectangle, circle, triangle, etc.) as long as it has a greater surface region on the door side than the grip region 110.

The actuating mechanism 100 comprises a housing 101, which, in the installed state, is arranged within the vehicle door. For example, as shown in FIG. 1, only portions of the actuating means 104 and the trough body 106 are visible on the interior skin of the vehicle door. The trough body 106 as well as the actuating means are connected to the housing 101.

The actuating mechanism 100 is connected to a door latch via a Bowden cable 103 in order to enable a mechanical unlocking, as will be explained in greater detail later on. The Bowden cable 103 extends into the interior of the housing 101.

Figure 3A:
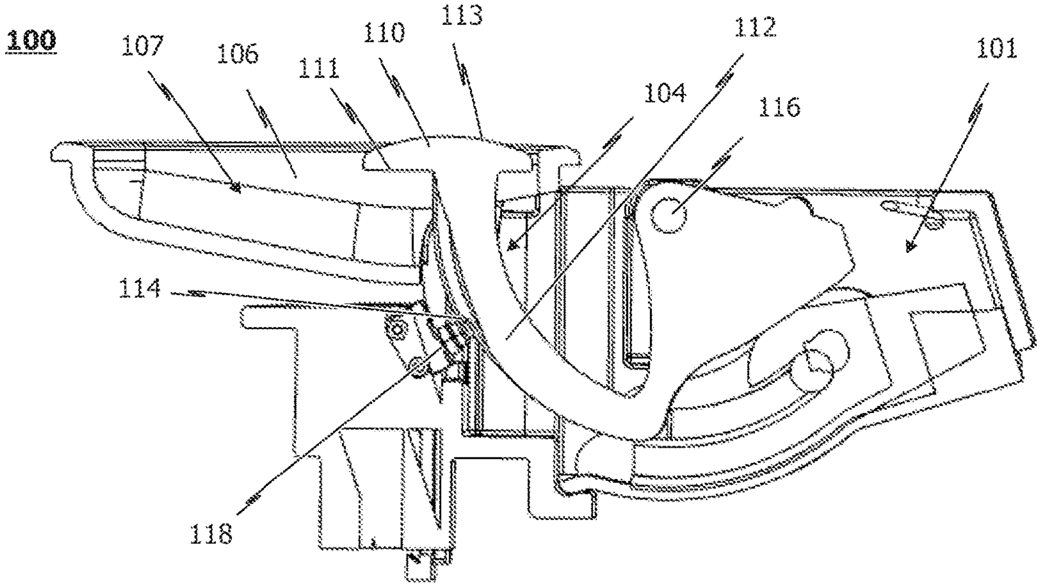
FIG. 3A is a cross-section through the actuating mechanism according to FIG. 2 in a home position of the actuating means.
Figure 3B:
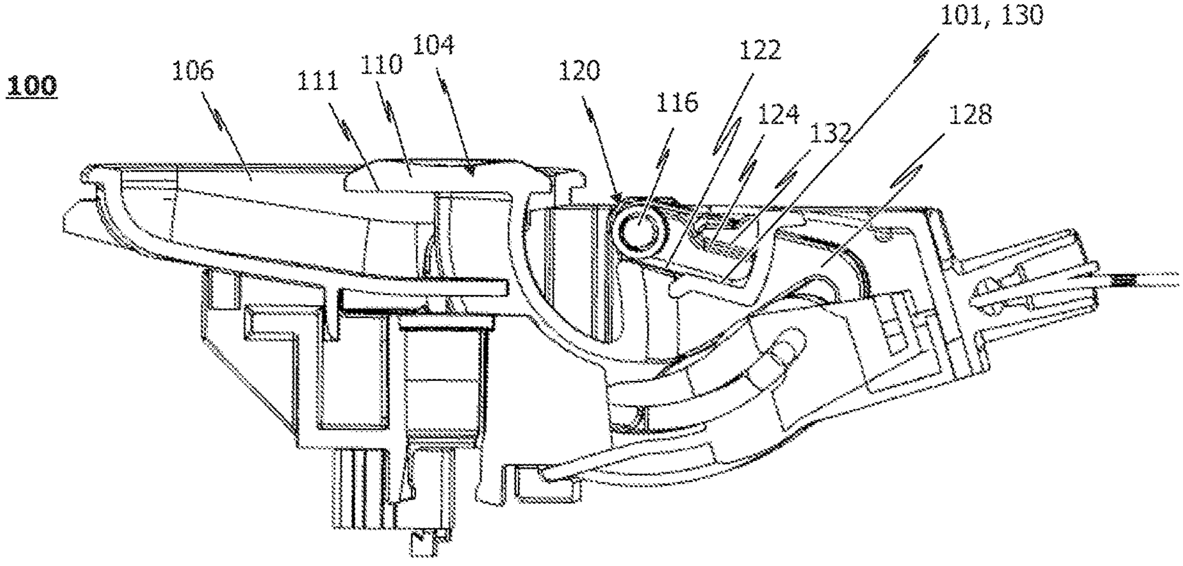
FIG. 3B is a cross-section through the actuating mechanism according to FIG. 2 in a home position of the actuating means.
Figure 3C:
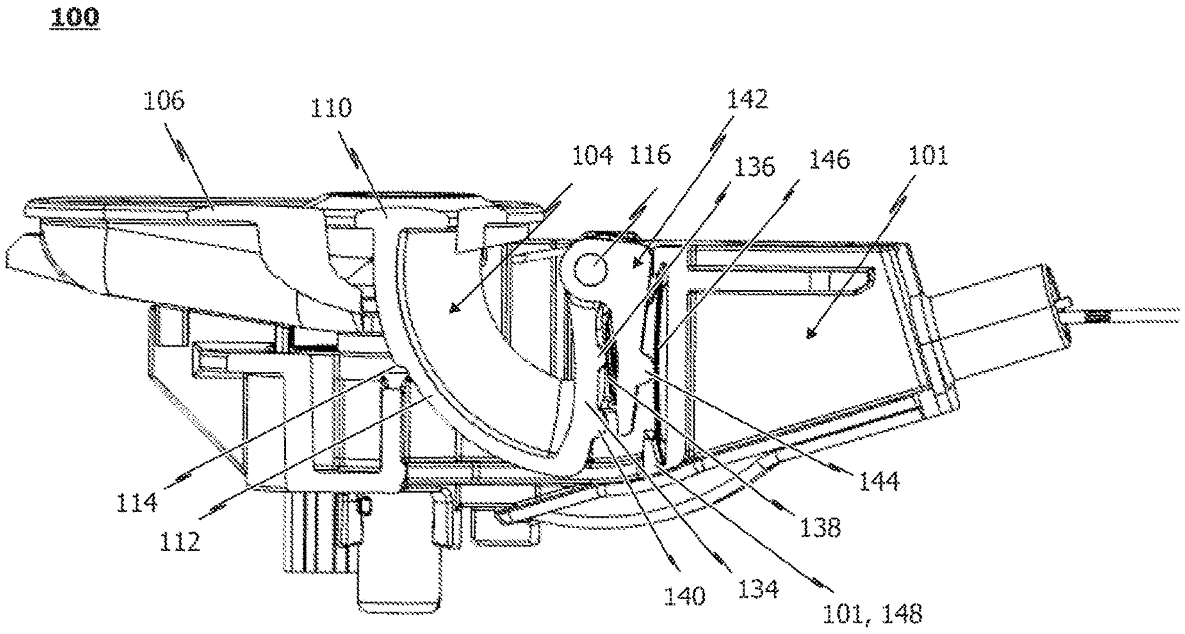
FIG. 3C is a cross-section through the actuating mechanism according to FIG. 2 in a home position of the actuating means.

FIGS. 3A to 3C show different cross-sections through the actuating mechanism 100 shown in FIG. 2 in a home position of the actuating means 104. The home position also corresponds to the position shown in FIG. 2. In this home position, the grip region 110 of the actuating means 104 is in particular flush with an outside of the trough body 106. In the home position shown here, neither an electrical signal for unlocking nor a manual unlocking is activated by the actuating mechanism. The actuating means 104 is in particular biased to the home position shown in FIGS. 3A to 3C.

FIG. 3A shows a first cross-section through the actuating mechanism 100. The actuating means 104 comprises the grip region 110, the outside of which 113 functions as a push-button for the user. An inside 111 of the grip region 110 acts as a pull-handle for the user. The grip region 110 is movable relative to the trough body 106. For this purpose, the actuating means 104 is connected to a pivot axis 116. The pivot axis 116 is fixedly connected to the housing 101 of the actuating mechanism 100.

The actuating means 104 has a curved region 112 arranged between the grip region 110 and the pivot axis 116. The grip region covers the curved region 112 and is oriented substantially perpendicular to the curved region 112. The grip region 110 protrudes beyond an edge of the curved region 112 and thus forms an engagement on its underside 111, which allows the user to pull the actuating means 104 out of the housing 101 for the emergency release. In the home position of the actuating means 104, the curved region 112 is obscured by the grip region 110 and thus not visible. In other words, in the home position of the actuating means 104, only the outside 113 of the grip region 110 is visible to the user. All other parts/areas of the actuating means 104 are arranged inside the housing 101 in the home position.

The curved region 112 has at least two different radii. In particular, the curved region 112 has a larger radius at a first sub-region connected to the grip region 110 than at a second sub-region connected to the pivot axis 116. A ramp 114 is provided between the first and second ends of the curved region 112. The ramp 114 is a transition between the aforementioned different radii.

The actuating mechanism 100 comprises a signal transmitter, which is shown herein as a microswitch 118. The microswitch 118 is a button that is in contact with the surface of the curved region 112 of the actuating means 104. In the home position of the actuating means 104 shown in FIGS. 3A to 3C, the button is in particular connected to the second sub-region of the curved region 112, which has the smaller radius. The actuating mechanism 100 is configured such that the microswitch 118 is not activated in this position. In other words, the button is not actuated by the curved region 112 in the home position of the actuating means 104.

FIG. 3B shows a further cross-section through the actuating mechanism 100 according to FIG. 2. Compared to FIG. 3A, the cross-section of FIG. 3B extends in a plane protruding further out from the drawing plane in FIG. 3A. In other words, the microswitch 118 of FIG. 3A is located behind the plane illustrated in FIG. 3B.

In the sectional plane illustrated in FIG. 3B, a torsion spring 120 of the actuating mechanism 100 is further shown. The torsion spring 120 is supported on the pivot axis 116. A first end 122 of the torsion spring 120 is supported on a stop surface 130 of the housing 101. A second end 124 of the torsion spring 120 is supported on a stop region 132 of the actuating means 104. The torsion spring 120 is in particular used in order to return the actuating means 104 from its emergency release position into the home position.

The actuating means 104 comprises an emergency release element 128, which is shown here as a hook, which is configured so as to grasp a pulling head (cf. FIG. 5A) of a Bowden cable 103 for emergency release.

FIG. 3C shows a further cross-section through the actuating mechanism 100 shown in FIG. 2. The sectional plane according to FIG. 3C lies in front of the sectional plane of FIGS. 3A and 3B. In other words, the sectional planes in FIGS. 3A and 3B are behind the sectional plane according to FIG. 3C.

The sectional plane according to FIG. 3C also shows the curved region 112 and the ramp 114 of the actuating means 104. The curved region 112 is connected at a first end to the grip region 110 of the actuating means 104. At an opposite second end of the curved region 112, the actuating means 104 comprises an actuating region 134. The actuating region 134 is in particular pivotally connected to the pivot axis 116. The actuating region 134 together with the curved region 112 forms a U-shape with a curved leg and a substantially straight leg. Overall, the actuating means 104 comprises a substantially trumpet-like cross-section.

The actuating mechanism 100 comprises a first flat spring 138 and a second flat spring 146. The two flat springs 138, 146 bias the actuating means 104 into its home position shown in FIGS. 3A to 3C.

In the home position of the actuating means 104, the actuating region 134 abuts the first flat spring 138. In particular, the actuating region 134 does not deform the first flat spring 138 in the home position of the actuating means 104. The actuating region 134 has a first protrusion 136 extending from the actuating region 134 towards the first flat spring 138. Accordingly, in particular the first protrusion 136 of the first actuating region 134 abuts the first flat spring 138 in the home position of the actuating means 104.

The actuating mechanism 100 comprises a pivot arm 142 connected to the pivot axis 116. The first flat spring 138 is attached to the first pivot arm 142. In other words, the pivot arm 142 is a pivotable support assembly for the first flat spring 138. The first pivot arm 142 is movable relative to the housing 101 as well as the actuating means 104. In particular, the pivot arm 142 is pivotable about the pivot axis 116.

In the home position shown in FIG. 3C, the first pivot arm 142 lies on the second flat spring 146. In particular, the pivot arm 142 has a second protrusion 144 that abuts the second flat spring 146 without deforming the second flat spring 146.

The second flat spring 146 is arranged directly on the housing 101. For this purpose, the housing 101 comprises the fastening region 148 shown in FIG. 3C.

The first and second flat springs according to the embodiment shown in FIG. 2 have different resetting forces. Specifically, the second flat spring 146 is a stronger spring than the first flat spring 138. For example, the second flat spring 146 can be thicker than the first flat spring 138. According to one design variant, the second flat spring 146 can consist of, for example, two or more leaf springs that are connected flush with one another.

However, it is not necessarily required for the two flat springs 138, 146 to have different resetting forces. Rather, it is of importance that the two flat springs are deformed at different points in time. In the illustrated embodiment, in particular, the first flat spring 138 is to be deformed first, before the second flat spring 146 is deformed. In order to achieve deformation of the two flat springs 138, 146 at different times, it must only be guaranteed, in particular, that the first flat spring 138 already deforms with a smaller force input than the second flat spring 146. To this end, it can also be provided, as an alternative to different resetting forces, that a lever length of the actuating region 134 is longer than a lever length of the pivot axis 142.

In alternative embodiments (not shown), the actuating mechanism only comprises a flat spring. This can then be connected directly to a rigid fastening region of the housing, for example, wherein a second flat spring and the pivot arm are not required. In other words, the actuating mechanism could merely have a flat spring, which is configured substantially like the second flat spring 146 according to FIG. 3C.

Figure 4A:
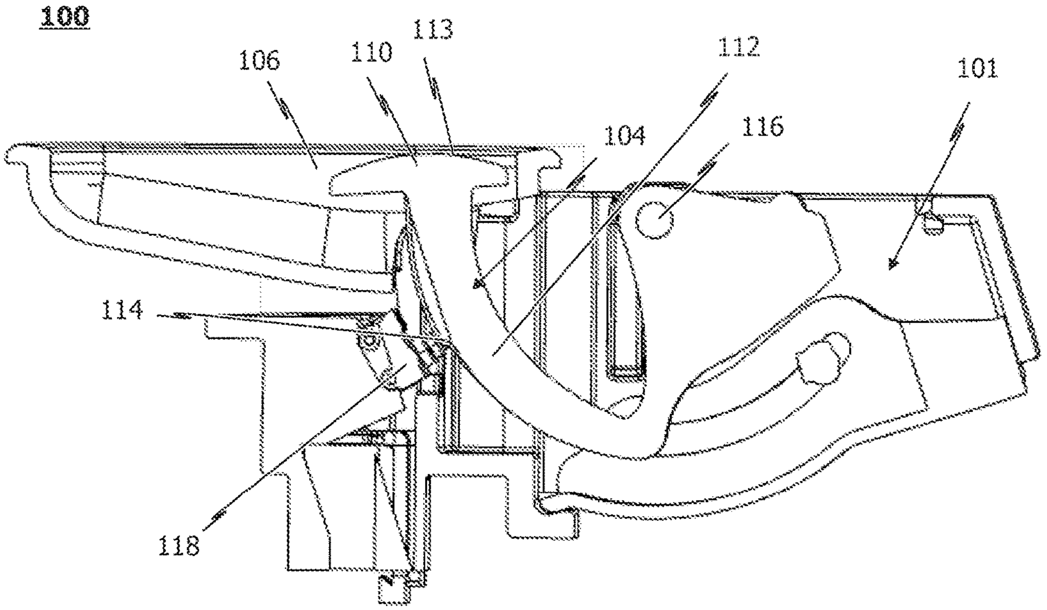
FIG. 4A is a cross-section through the actuating mechanism according to FIG. 2 in a first actuating position of the actuating means.
Figure 4B:
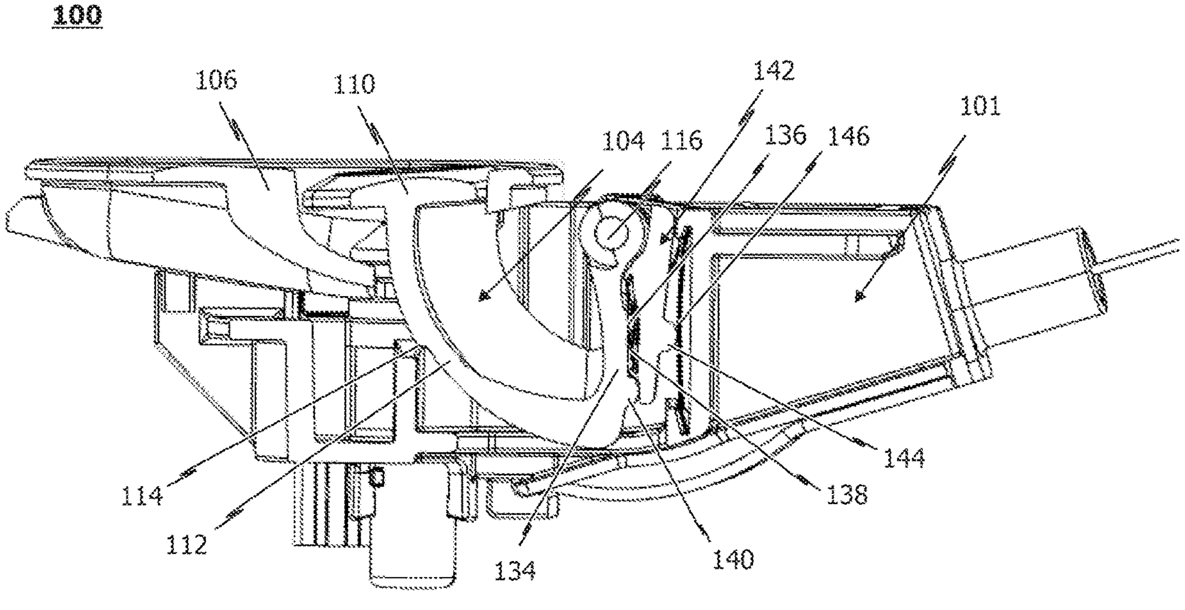
FIG. 4B is a cross-section through the actuating mechanism according to FIG. 2 in a first actuating position of the actuating means.

FIGS. 4A and 4B show the actuating mechanism 100 in the actuating position of the actuating means 104. Here, the sectional axis according to FIG. 4A corresponds to the sectional axis according to FIG. 3A. The sectional axis according to FIG. 4B corresponds to the sectional axis according to FIG. 3C.

In the actuating position of the actuating means 104, it is pivoted inwardly (that is, towards the housing 101 or the vehicle door, respectively). FIG. 4A accordingly shows that the grip region 110 is no longer arranged flush with the top end of the trough body 106 but rather has been pushed into the trough body 106. For this purpose, the user presses on the outside 113 of the grip region 110. The user's pressing of the grip region 110 causes in particular a pivoting of the actuating means 104 about the pivot axis 116, opposite the microswitch 118.

In the actuating position, the actuating means 104 has been pivoted with respect to the microswitch 118 such that the ramp 114 is driven over the button of the microswitch 118, so that it is pushed in due to the larger radius of the curved region 112. Thus, in the actuating position of the actuating means 104, the microswitch 118 is switched in order to generate a signal to activate an electric drive. In other words, the actuating mechanism 100 is configured in order to generate an electrical actuation signal in the actuating position.

FIG. 4B shows that the first flat spring 136 has been deformed in the first actuating position of the actuating means 104. In other words, the actuating region 134 of the actuating means 104 has been moved opposite the pivot arm 142, contrary to the resetting force of the first flat spring 138. This results in a deformation of the first flat spring 138 by the first protrusion 136. The second flat spring 146 is not deformed in the actuating position. In the illustrated embodiment, this is achieved in particular by a second flat spring 146 that is stronger than the first flat spring 138, i.e., having a higher spring constant.

The first flat spring and the second flat springs 138, 146 can be configured as snap springs (also known as snap frogs). Accordingly, the deformation of the flat springs 138, 146 provides a haptic as well as an acoustic feedback to the user. In the actuating position according to FIGS. 4A and 4B, the user knows from the acoustic and haptic feedback of the first flat spring 138 configured as a snap spring that the first actuating position has been reached and that a signal has been generated by the microswitch 118.

The deformation of the first spring element 138 is limited by a stop 140 of the actuating region 134. The stop 140 abuts the pivot arm 142 in the actuating position of the actuating means 104. Thus, the relative movement between the actuating means 104 and the pivot arm 142 is limited. A further pivoting of the actuating means 104 towards the flat springs 138, 146 is transferred directly to the pivot arm 142 and thus to the second flat spring 146 from the actuating position. In other words, the pivot arm 142 is pivoted together with the actuating means 104 should the user continue to push in the actuating means 104 even after the snapping by the first flat spring 138.

Typically, the user will release the grip region 110 upon reaching the first actuating position such that the first flat spring 138 snaps back and the actuating means reverts back to its home position. Thus, the biasing force of the first flat spring 138 is used in order to pivot the actuating means 104 clockwise back into its home position.

The second flat spring 146 is deformed in the illustrated embodiment only if the user pushes the actuating means 104 beyond the actuating position into the housing. The second flat spring 146 serves in particular to provide a second acoustic and/or haptic feedback. The second flat spring is optional and has no effect on the electrical release using the microswitch 118 or the manual release as described in FIGS. 5A to 5C.

Figure 5A:
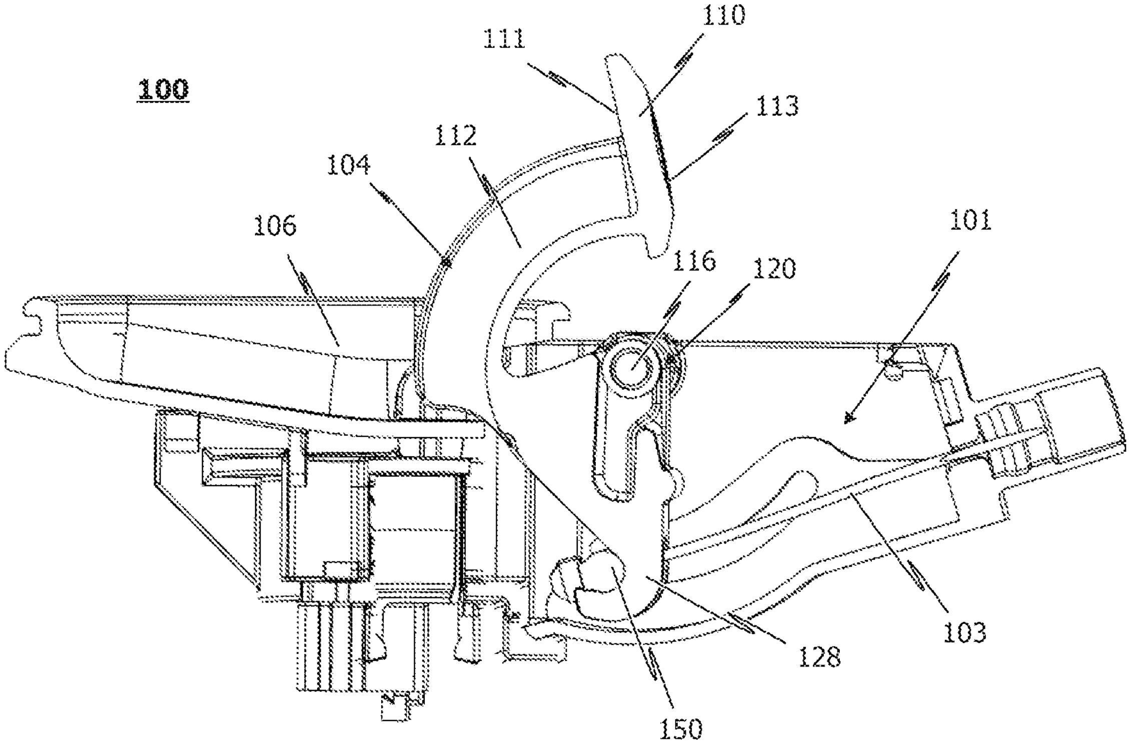
FIG. 5A is a cross-section through the actuating mechanism according to FIG. 2 upon activation of the emergency release.
Figure 5B:
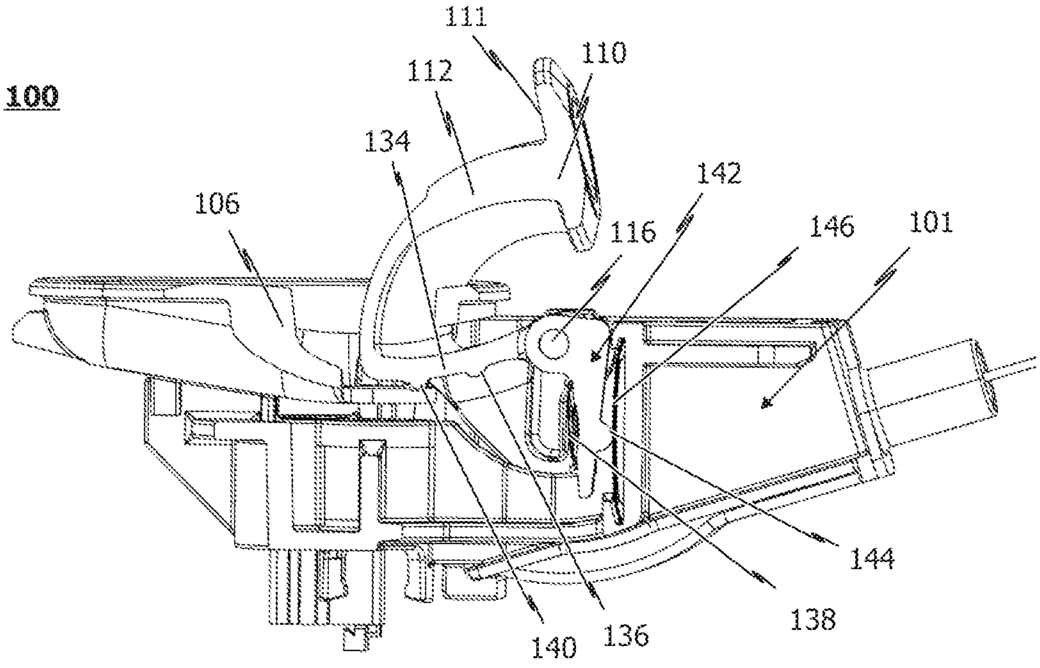
FIG. 5B is a cross-section through the actuating mechanism according to FIG. 2 upon activation of the emergency release.
Figure 5C:
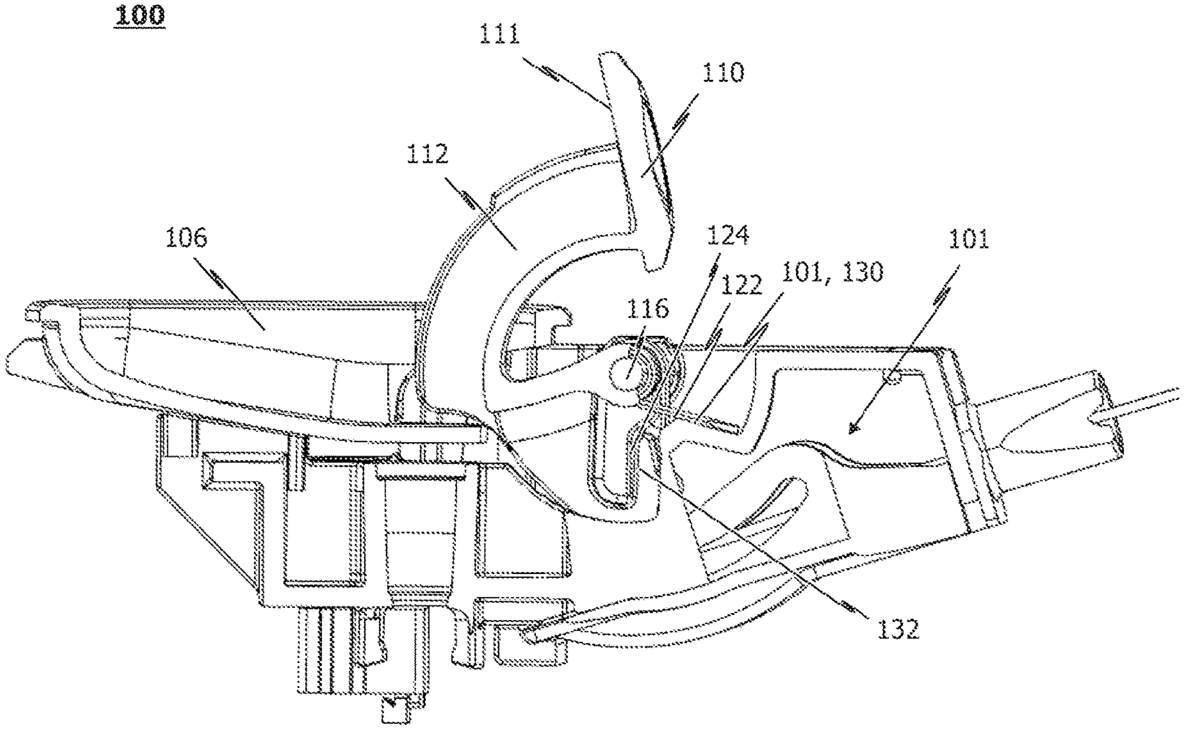
FIG. 5C is a cross-section through the actuating mechanism according to FIG. 2 upon activation of the emergency release.

FIGS. 5A to 5C show the emergency release position of the actuating means 104. For this purpose, the actuating means 104 was pivoted in particular clockwise so that the grip region 110 and the curved region 112 protrude out of the housing 101. In order to pivot the actuating means 104 away from the home position into the emergency release position according to FIGS. 5A to 5C, the user can, in the home position, engage the free engagement region 107 (FIGS. 2 and 3A) and use the inside 111 of the grip region 110 as a pull-handle. The depth of the trough body 106 is configured such that a user can rearwardly engage the grip region 110 with at least one finger.

Pulling on the grip region 110 will slide the actuating means in a clockwise direction. The actuating means 104 can thereby be pivoted by approx. 80° to 100°, in particular by approx. 90°, relative to the home position in order to reach the emergency release position. In the emergency release position, both the grip region 110 and the curved region of the actuating means 104 are visible.

A pivoting of the actuating means 104 clockwise (for example, through a pulling by the user) out of the home position also causes the emergency release element 128 to pivot and be brought into operative engagement with a pulling head 150 of the Bowden cable 103. By pivoting the actuating means 104 into its emergency release position, a pulling force is applied to the Bowden cable 103. As a result, a mechanical unlocking of the vehicle door can occur.

From FIG. 5B, it can be seen that the two flat springs 138, 146 remain in their initial position (that is, not deformed) when the actuating means 104 is transferred into the emergency release position. Thus, the pivot arm 142 remains in its initial position when the emergency release is actuated.

As illustrated in FIG. 5C, the emergency release is performed counter to the biasing of the torsion spring 120. In particular, a pivoting of the actuating means 104 in the clockwise direction causes the second end 124 of the torsion spring 120 to twist relative to the first end 122. The first end 122 remains in its initial position. A tensioning of the torsion spring 120 occurs, which counteracts the pivoting of the actuating means 104 towards the emergency release position. The torsion spring 120 thus serves to return the actuating means 104 into its home position shown in FIGS. 2 to 3C.

The present disclosure is not limited to the embodiment shown in the figures. Rather, it results from a summary of all the features shown in the figures.

What is claimed is:

1. An actuating mechanism for actuating vehicle doors, wherein the actuating mechanism comprises the following:

a housing having a pivot axis; and an actuating element, which is transferable from a home position into an actuating position in order to generate an electrical actuation signal and into an emergency release position for manual unlocking of the vehicle door, wherein the actuating element comprises a grip region, wherein the actuating element comprises a curved region, which is pivotally connected to the pivot axis, wherein the curved region is located along a length of the actuating element between the pivot axis and the grip region, wherein the curved region is arranged in the home position of the actuating element in the housing and protrudes from the housing in the emergency release position of the actuating element, and wherein the actuating element is pivotable in a first direction for the transfer from the home position into the actuating position and pivotable in an opposite second direction for the transfer from the home position into the emergency release position.

2. The actuating mechanism according to claim 1, wherein the curved region is pivotable into the housing for the transfer into the actuating position or wherein the curved region is pivotable out of the housing for the transfer into the emergency release position.

3. The actuating mechanism according to claim 1, wherein the actuating element comprises a substantially trumpet-like cross-section.

4. The actuating mechanism according to claim 1, wherein the actuating element is pivotable by 90° between the home position and the emergency release position.

5. The actuating mechanism according to claim 1, wherein the curved region comprises a first portion having a first radius and a second portion having a second, smaller radius.

6. The actuating mechanism according to claim 1, wherein the grip region is configured to cover the curved region in the home position or the actuating position.

7. The actuating mechanism according to claim 6, wherein the grip region comprises an outer side configured as a push-button for transferring the actuating element into the actuating position and a rear side configured as a pull-handle for transferring the actuating element into the emergency release position.

8. The actuating mechanism according to claim 7, wherein the actuating mechanism comprises a trough body extending around the grip region in such a way that the rear side of the grip region is graspable in the home position of the actuating element.

9. A vehicle having the actuating mechanism according to claim 1.

10. The actuating mechanism according to claim 1, wherein the actuating element is pivotable by at least 80° between the home position and the emergency release position.

11. An actuating mechanism for actuating vehicle doors, wherein the actuating mechanism comprises the following:

a housing having a pivot axis; and an actuating element, which is transferable from a home position into an actuating position in order to generate an electrical actuation signal and into an emergency release position for manual unlocking of the vehicle door, wherein the actuating element comprises a curved region pivotally connected to the pivot axis, wherein the curved region is arranged in the home position of the actuating element in the housing and protrudes from the housing in the emergency release position of the actuating element, wherein the actuating element is pivotable in a first direction for the transfer from the home position into the actuating position and pivotable in an opposite second direction for the transfer from the home position into the emergency release position, and wherein the curved region comprises a first portion having a first radius and a second portion having a second, smaller radius.

12. The actuating mechanism according to claim 11, wherein the curved region is pivotable into the housing for the transfer into the actuating position or wherein the curved region is pivotable out of the housing for the transfer into the emergency release position.

13. The actuating mechanism according to claim 11, wherein the actuating element comprises a substantially trumpet-like cross-section.

14. The actuating mechanism according to claim 11, wherein the actuating element is pivotable by 80° to 100° between the home position and the emergency release position.

15. An actuating mechanism for actuating vehicle doors, wherein the actuating mechanism comprises the following:

a housing having a pivot axis; and an actuating element, which is transferable from a home position into an actuating position in order to generate an electrical actuation signal and into an emergency release position for manual unlocking of the vehicle door, wherein the actuating element comprises a curved region, which is pivotally connected to the pivot axis, wherein the curved region is arranged in the home position of the actuating element in the housing and protrudes from the housing in the emergency release position of the actuating element, wherein the actuating element comprises a handle region, which is arranged at a first end of the curved region and is configured in order to cover the curved region in the home position or the actuating position, wherein the handle region comprises an outer side configured as a push-button for transferring the actuating element into the actuating position and a rear side configured as a pull-handle for transferring the actuating element into the emergency release position, and wherein the curved region comprises a first portion having a first radius and a second portion having a second, smaller radius.

16. The actuating mechanism according to claim 15, wherein the curved region is pivotable into the housing for the transfer into the actuating position or wherein the curved region is pivotable out of the housing for the transfer into the emergency release position.

17. The actuating mechanism according to claim 15, wherein the actuating element comprises a substantially trumpet-like cross-section.

18. The actuating mechanism according to claim 15, wherein the actuating mechanism comprises a trough body extending around the handle region in such a way that the rear side of the handle region is graspable in the home position of the actuating element.

* * * * *